United States Patent [19]

Ohashi et al.

[11] Patent Number: 4,831,862
[45] Date of Patent: May 23, 1989

[54] MULTISTEP BENDING MACHINE

[75] Inventors: Yoshihiko Ohashi, Machida; Tadahiko Nagasawa, Ashigara-Kamigun; Katsumi Koyama, Hiratsuka, all of Japan

[73] Assignee: Amada Company, Limited, Japan

[21] Appl. No.: 64,396

[22] Filed: Jun. 22, 1987

[30] Foreign Application Priority Data

| Jun. 20, 1986 | [JP] | Japan | 61-142982 |
| Jul. 7, 1986 | [JP] | Japan | 61-157994 |
| Jul. 25, 1986 | [JP] | Japan | 61-173913 |
| Jul. 30, 1986 | [JP] | Japan | 61-177805 |
| Jul. 30, 1986 | [JP] | Japan | 61-177806 |

[51] Int. Cl.$^4$ .............................................. B21D 5/04
[52] U.S. Cl. ............................................ 72/389; 72/7; 72/441; 72/461; 72/453.01
[58] Field of Search ............... 72/389, 21, 453.01, 72/2, 443, 441, 461, 22.7

[56] References Cited

U.S. PATENT DOCUMENTS

| 4,408,471 | 10/1983 | Gossard et al. | 72/389 |
| 4,430,879 | 2/1984 | Rolland | 72/461 |
| 4,486,841 | 12/1984 | Koyama et al. | 72/389 |
| 4,488,237 | 12/1984 | Aronson et al. | 72/461 |
| 4,511,976 | 4/1985 | Graf | 72/389 |
| 4,656,862 | 4/1987 | Kogure et al. | 72/389 |

Primary Examiner—David Jones
Attorney, Agent, or Firm—Wigman & Cohen

[57] ABSTRACT

In a multistep bending machine, a movable apron (LA) provided with a movable tool (D) is moved in a multistep manner up and down toward a fixed apron (UA) provided with a fixed tool (P) by a hydraulic system including a novel die-axis drive mechanism (DDM), when a foot switch (FS) is kept depressed.

In addition, an interference prevention device (IPA), a bending speed determining device (SDA), a tool distance determining device (TDA), a backgage stopper positioning device (SPA), and a backgage stopper pullback distance controlling device (PDC) are all incorporated in the bending machine to realize a full automatic multistep bending operation.

10 Claims, 17 Drawing Sheets

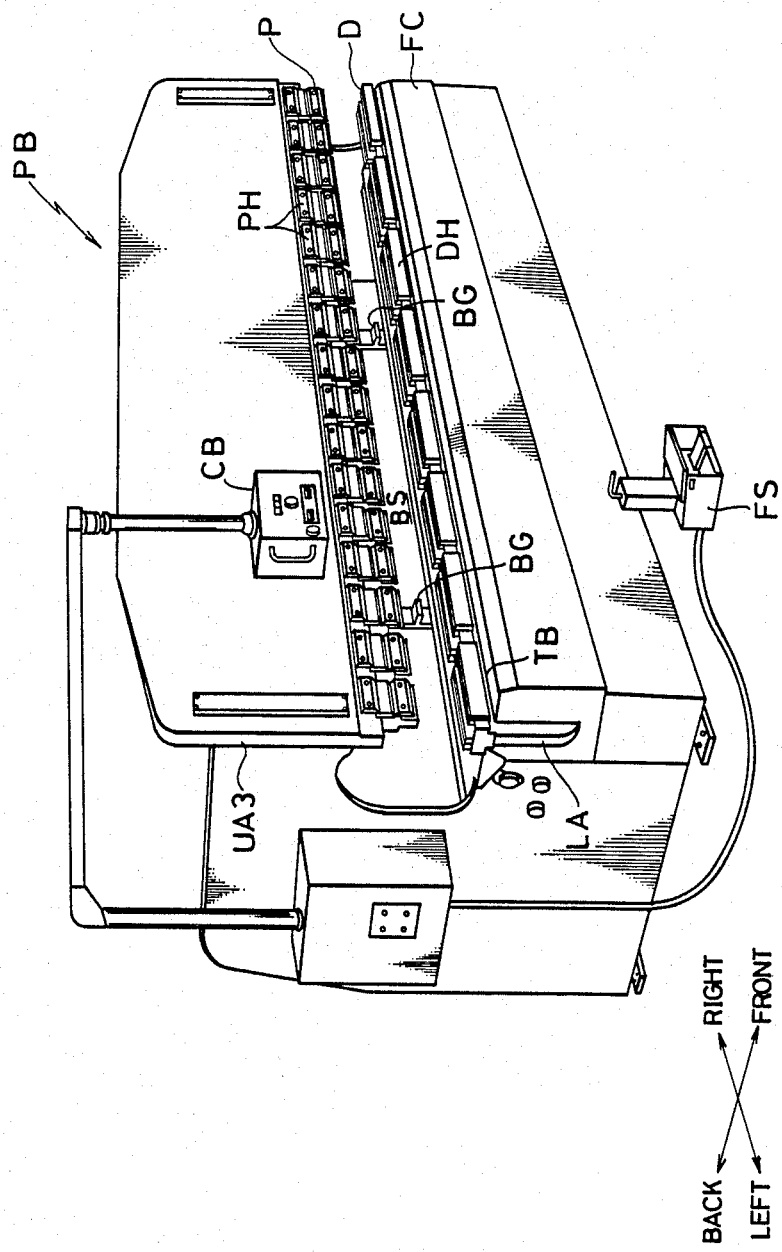

MULTISTEP BENDING MACHINE

BACKGROUND OF THE INVENTION

1. Field of the Invention

The present invention relates to a multistep bending machine such as a press brake, by which a workpiece can be bent into a relatively complicated shape by continuously bending a workpiece into a plurality of angles of different bending points in multistep bonding process.

2. Description of the Prior Art

In the conventional multistep bending machine, the bending operation is mainly dependent upon the operator's work. In more detail, a backgage (a workpiece end stopper) is located in both horizontal and vertical direction; a foot switch is depressed to bend a located workpiece for the first bending operation; the backgage is again located for the second bending operation before depressing the foot switch again. Therefore, it is necessary for the operator to repeatedly depress the foot switch, thus resulting in a troublesome work and a long bending time.

Further, in the above multistep bending machine, since an already-bent workpiece is repeatedly bent, it is necessary to decide a bending sequence in which no interference of the workpiece with the machine including a pair of bending tools will be produced. In doing this, conventionally, a skilled operator decides the bending sequence on the basis of a finished product (bent into a final shape) and a return bendgraph for each die or on the basis of a number of workpiece drawings describing a bent workpiece shape at each bending process, separately. Therefore, in the case of a complicated bent product, it takes a long time to decide the bending sequence involving no interference with the machine.

Further, when bending speed of a movable tool (e.g. a punch) is too high in relation to a workpiece length from the tool center, the workpiece is excessively bent due to workpiece inertia, thus deteriorating the bending accuracy. Further, when a workpiece is once removed and then inserted into the tool space after turned around in order to prevent the above-mentioned interference, it is necessary to move a movable tool away from a fixed tool. Conventionally, this tool distance is determined by the operator. However, if this distance is too large, this lowers machine efficiency.

Further, it is necessary to locate the workpiece by a backgage stopper member for each bending operation, so that a predetermined bending line is positioned just under the tool. In the case of a flat workpiece, a distance between the stopper member and the tool center can be determined simply. However, in the case of the already-bent workpiece, the distance is not simply calculated according to the shape of the product.

Furthermore, when an already-bent workpiece is located by a backgage stopper member before bending operation and then bent, it is impossible to keep the stopper member as it is, because the extreme end of the workpiece will interface with the stopper member. Therefore, it is necessary to pull-back the stopper member immediately before the bending operation to prevent the interference. Conventionally, this pull-back distance is also determined by the operator.

SUMMARY OF THE INVENTION

With these problems in mind, therefore, it is the primary object of the present invention to provide a multistep bending machine, by which a workpiece can be automatically bent into a relatively complicated shape through multistep bending operations, thus improving bending accuracy, and inefficiency.

To achieve the above-mentioned object, the multistep bending machine having a pair of fixed and movable aprons with a pair of bending tools, respectively, a backgage provided with a stopper member for positioning an end of a workpiece, and an NC system operated by a switch, according to the present invention comprises: (a) means for moving the movable apron up and down toward the fixed apron for bending operation; (b) means for determining a limit position of the movable apron relative to the fixed apron; and (c) means for moving up and down the movable apron between tow limit positions in a multistep manner at predetermined time intervals when said movable apron moving means are being actuated.

The above multistep bending machine further comprises interference prevention means: bending speed determining means; tool distance determining means; backgage stopper positioning means; and backgage stopper pull-back distance controlling means, in order to realize full automatic multistep bending operation.

BRIEF DESCRIPTION OF THE DRAWINGS

FIG. 1(A) is a perspective view showing a press brake by way of example of bending machines, to which the present invention is applied;

FIG. 4(F)-1 is an illustration for assistance in explaining a removal distance of a bent workpiece;

FIG. 4(F)-2 is an illustration for assistance in explaining an insertion distance of a bent workpiece;

FIGS. 5(D)-1, -2 and -3 are illustrations for assistance in explaining corrections required when the stopper distance is determined;

DETAILED DESCRIPTION OF PREFERRED EMBODIMENT

FIG. 1(A) shows a press brake PB as an example of bending machines, to which the present invention can be applied. The press brake PB includes a fixed upper apron UA and a movable lower apron LA. A punch P is fixed to a lower portion of the upper apron UA via a punch holder PH with bolts; while a die D is fixed to an upper portion of the lower apron LA via a die holder DH with bolts. These two aprons UA and LA are inserted from one side of the machine before fixed with bolts. Further, a front cover FC provided with a tool base TB extending in the right and left direction in FIG. 1(A) is disposed on the front surface of the lower apron LA. A movable control board CB and a movable foot switch FS are provided in connection to an NC system (not shown) in order to control the operation of the machine PB. A backgage BG is provided between the punch P and the die D, that is, within a bending space BS.

Figure 1B:
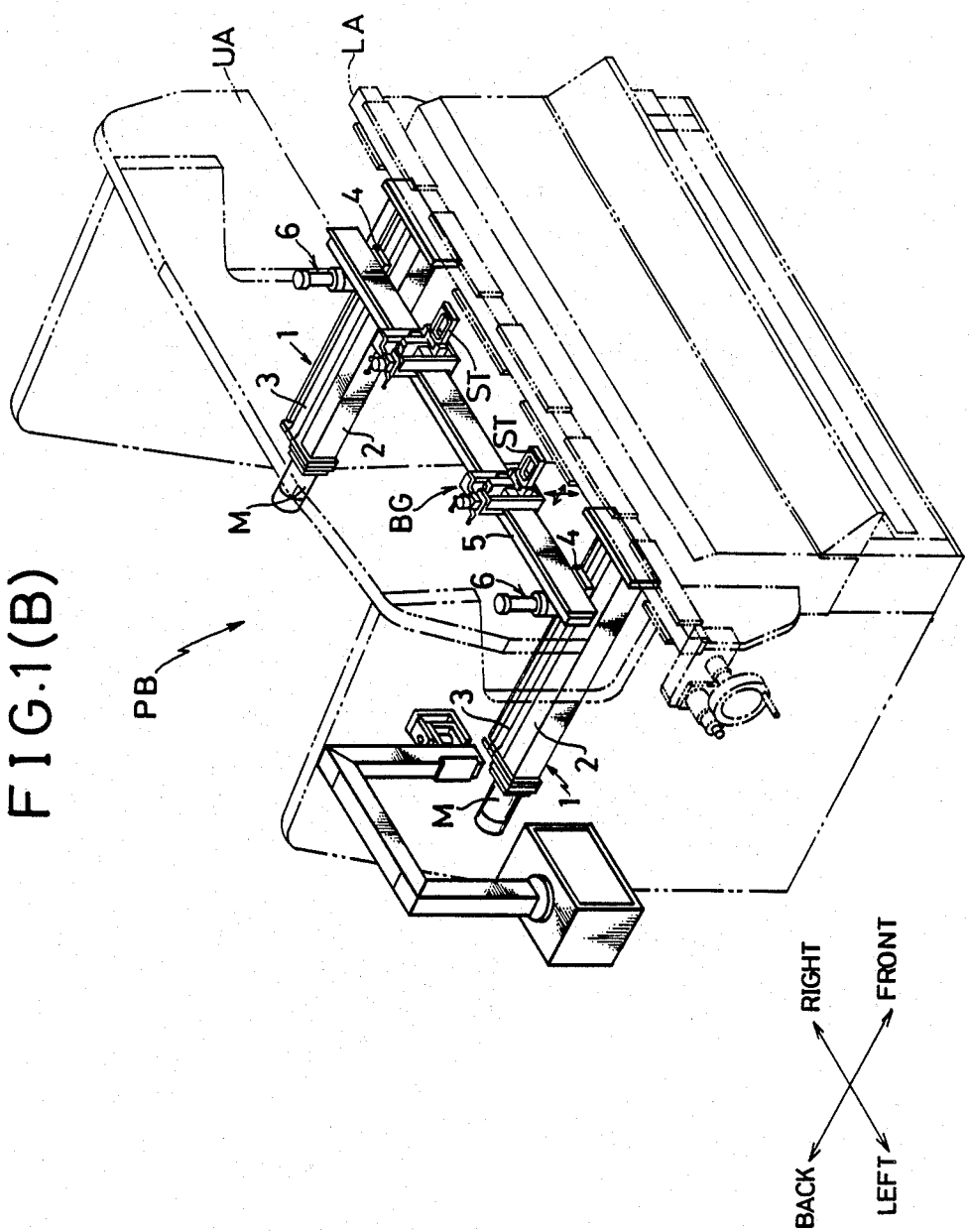
FIG. 1(B) is a perspective view showing a backgage incorporated in the press brake shown in FIG. 1(A)

FIG. 1(B) shows a backgage BG, in which a pair of support members 1 are provided so as to project backward from the lower apron LA on both the sides thereof. On each support member 1, there are mounted a motor M, a parallel lead screw 2 and a parallel linear guide 3. On each linear guide 3, a movable base member 4 is slidably mounted. A beam 5 is horizontally disposed between the two movable base members 4. This beam 5 can be adjustably moved up and down by two backgage lifting devices 6. Further, two stopper members ST are slidably engaged with the beam 5. Therefore, the stopper members ST can also be moved up and down by the lifting device 6.

In summary, the stopper members ST of the backgage BG can be adjustably moved up and down by the lifting devices 6 and also back and forth by the motors M through the lead screws 2, the linear guides and the movable base members 4. Further, the stopper members ST can slidably be adjusted in the right and left direction along the beam 5.

In bending operation, a workpiece is inserted into the bending space BS until an end surface of a workpiece is brought into contact with the stopper member ST of the backgage BG. Thereafter, the lower apron LA is moved toward the upper apron UA by operating the control board CB or the foot switch FS to bend the inserted workpiece between the punch P and the die D. The above operation is controlled automatically by the NC system.

Figure 2A:
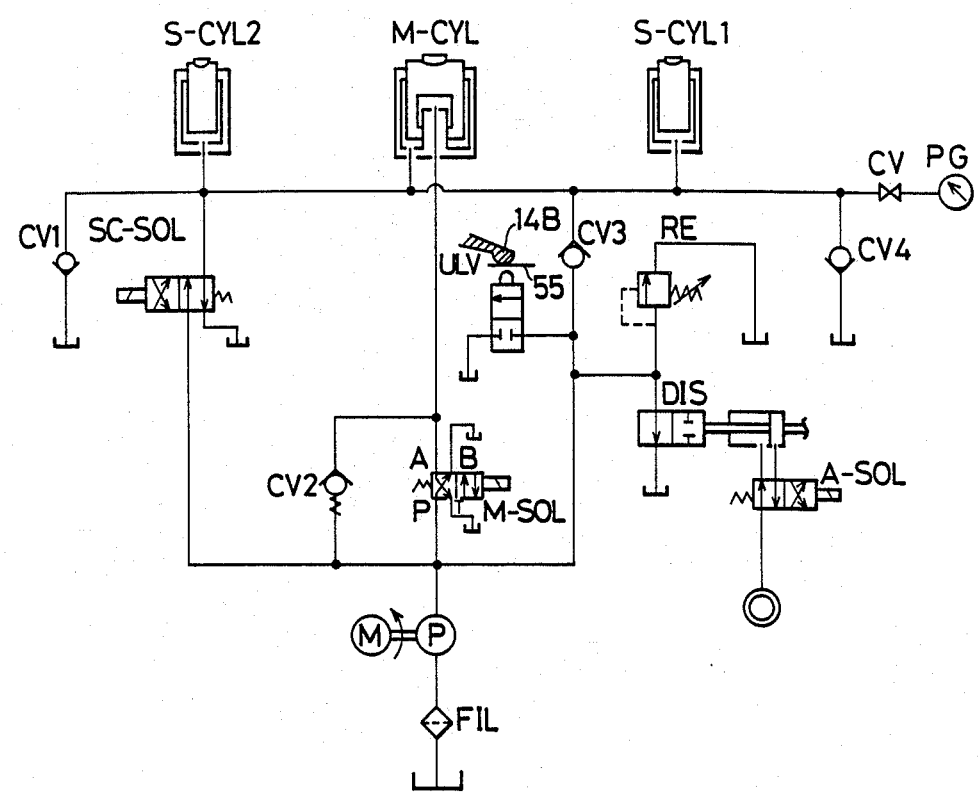
FIG. 2(A) is a hydraulic/pneumatic circuit diagram of a multistep hydraulic drive system incorporated in the press brake.

FIG. 2(A) shows a hydraulic pneumatic circuit for moving the lower apron LA up and down in a multistep manner near the upper limit position of the lower apron LA. The lower apron LA is driven by a main cylinder M-CYL and two subcylinders S-CYL1 and S-CYL2. Hydraulic pressure is supplied from a pump P to the main cylinder M-CYL via a main solenoid valve M-SOL. Further, hydraulic pressure is supplied from the pump P to the three cylinders M-CYL, S-CYL1 and S-CYL2 via a speed control valve SC-SOL. Further, an upper limit valve ULV, a distributor valve DIS, and a regulator valve RE are connected to a hydraulic line communicating with the subcylinders S-CYL1 and S-CYL2. The distributor valve DIS is adjusted to an air cylinder solenoid A-SOL. Further, check valves CV1 to CV4, a filter FIL, a cut-off valve CV, and a pressure gage PG, etc. are connected in position with the hydraulic pneumatic circuit.

Figure 2B:
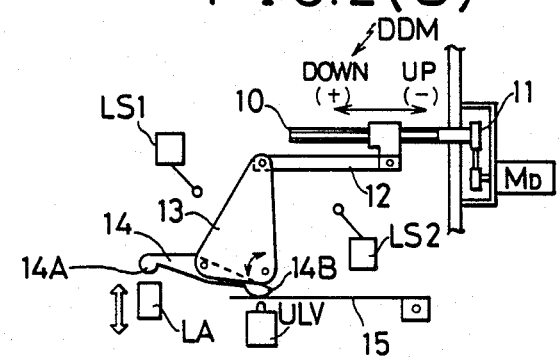
FIG. 2(B) is diagrammatic illustration showing a D-axis (die-axis) drive mechanism incorporated in the drive system shown in FIG. 2(A)

FIG. 2(B) shows a die-axis (D-axis) drive mechanism DDM for vertically moving the lower apron LA up and down for multistep bending operation. To drive the lower apron LA, the upper limit valve ULV is actuated (opened) or deactuated (closed) by a D-axis motor $M_D$. In more detail, the D-axis drive mechanism DXM comprises a D-axis motor $M_D$, a feed screw 10 rotated by the motor $M_D$ via a transmission gear train 11. A movable member 12 is geared with the feed screw 10, and a triangular link 13 is pivotally connected to one end of the movable member 12. A pivotal lever 14 is coupled with the link 13. A first free end 14A of the lever 14 detects the vertical position of the lower apron LA, while a second free end 14B of the lever 14 actuates the upper limit valve ULV via a flat spring 15. A first limit switch LS1 detects an overtravel of the lower apron LA toward the downward (plus) side; while a second limit switch LS2 detects an overtravel of the lower apron LA toward the upward (minus) side, both near the upper limit position of the lower apron LA.

The operation of the hydraulic/pneumatic circuit shown in FIGS. 2(A) and (B) will be described. To move the lower apron LA upward, hydraulic pressure is supplied from the pump P to the main cylinder M-CYL through the main solenoid valve M-SOL. In this operation, if the speed control valve SC-SOL is actuated (open), the speed of the lower apron LA is switched to a low speed near the workpiece pinching point. In summary, it is possible to freely adjust the lower limit position of the lower apron 5 by actuating (opening) or deactuating (closing) the main solenoid valve M-SOL, that is, by adjustably operating the main cylinder M-CYL.

The upper limit valve ULV is normally kept deactuated (closed). Therefore, when this valve ULV is actuated (opened), pressure is released to lower the lower apron LA.

To move the lower apron LA up and down in a multistep manner near the upper limit position by the D-axis drive mechanism as shown FIG. 2(B), the D-axis motor $M_D$ is driven under control of the NC system (not shown). When the feed screw 10 rotates to move the movable member 12 in the plus direction, the free end 14B of the lever 14 deforms the flat spring 15 to actuate (open) the upper limit valve ULV to lower the lower apron LA.

In contrast, when the movable member 12 is moved in the minus direction, the free end 14B of the lever 14 releases the deformation of the flat spring 15 to deactuate (close) the upper limit valve ULV, so that the hydraulic circuit is closed to raise the lower apron LA. Once the lower apron LA rises, the lower apron LA pushes the free end 14A of the lever 14, so that the upper limit valve ULV is actuated (open) again to stop the upward motion of the lower apron LA.

As described above, when the D-axis motor $M_D$ is rotated in the forward or reverse direction, the movable member 12 is moved in the plus or minus direction by the feed screw 10, so that the lower apron LA can be moved up and down near the upper limit position to achieve multistep bending operation, as long as the foot switch FS is kept closed.

Figure 2C:
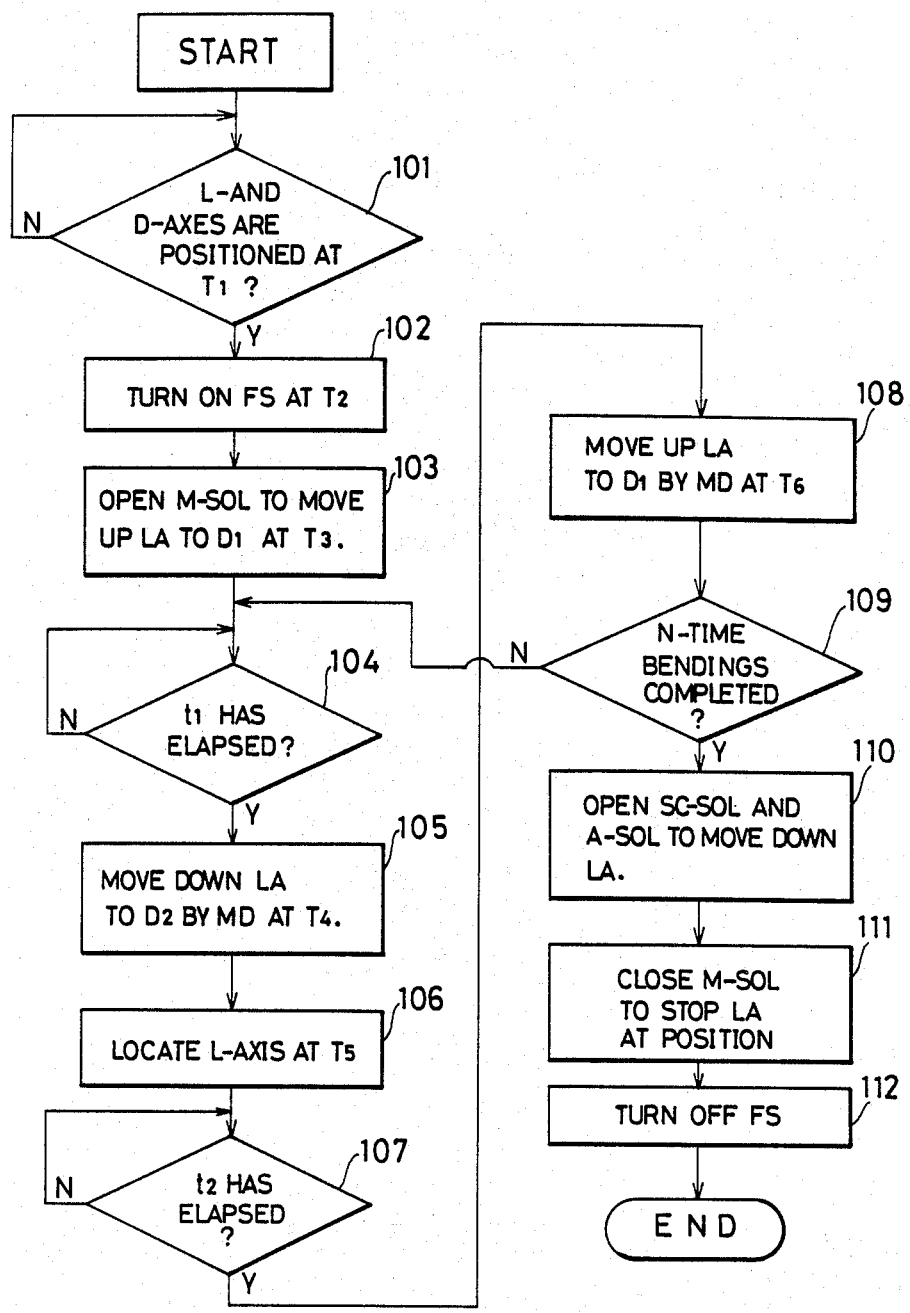
FIG. 2(C) is a flowchart showing the multistep operation of the hydraulic drive system shown in FIG. 2(A)
Figure 2D:
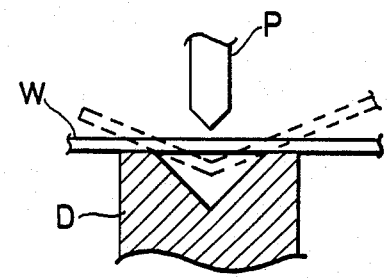
FIG. 2(D) is a view showing a workpiece arranged between a punch and die.
Figure 2E:
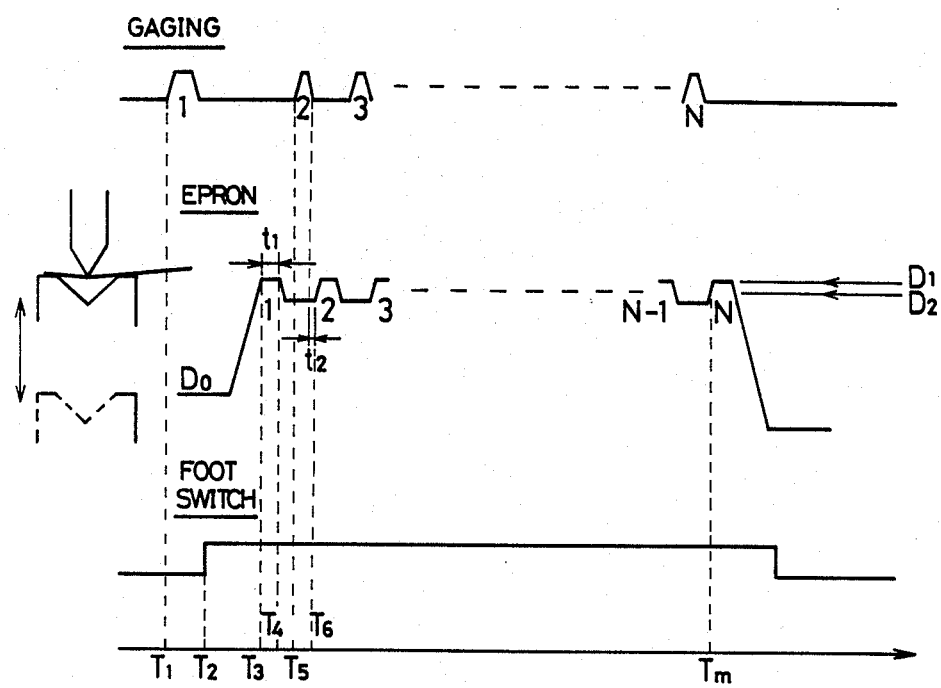
FIG. 2(E) is a timing chart of the hydraulic drive system.

With reference to FIGS. 2(C) to (E) the operation of multistep bending operation will be described hereinbelow in further detail.

At timing $T_1$ in FIG. 2(E), the stopper member ST of the backgage BG is moved back and forth by the motors M (FIG. 1B) for L (longitudinal) axis positioning. Further, the die D (the lower apron LA) is moved down to the lower limit position $D_0$ (in step 101). Under these initial conditions, the extreme side end of a workpiece W is brought into contact with the stopper members ST, and then the foot switch FS is depressed (in step 102). Therefore, the main solenoid M-SOL is actuated open to move up the lower apron LA to the upper limit $D_1$, at which the first obtuse-angle bending is effected at timing $T_3$ (in step 103).

After a predetermined time period $t_1$ has elapsed, the D-axis motor $M_D$ is driven at timing $T_4$ to move the movable member 12 in the plus direction to open the upper limit valve ULV, so that the lower apron LA (i.e. the die D) is lowered to position $D_2$ (in step 105).

Thereafter, the second bending is effected. That is, the backgage BG is adjusted by the motors M for the second L-axis location at timing $T_5$ (in step 106). After a predetermined time $t_2$ has elapsed (in step 107), the D-axis motor $M_D$ is driven in the minus direction to deactuate (close) the upper limit valve ULV again at timing $T_6$, so that the lower apron LA is moved up again to the upper limit position $D_1$ for the second bending operation (in step 108).

The above steps 104 to 108 are repeated by a predetermined N times to continuously bend in a multistep manner the workpiece W into obtuse angles (in step 109).

When the N-time bending operations end at timing $T_m$, the speed control valve SC-SOL and the air cylinder valve A-CYL are actuated open to lower the lower apron LA (in step 110). Thereafter, at a position designated by the NC system, the main solenoid valve M-SOL is closed to stop the downward motion of the lower apron LA (in step 111). The foot switch FS is then turned off to complete the N-time multistep bending operations.

In the above description, the foot switch FS is kept depressed during the N-time bending operations. However, it is also possible to hold the turn-on status of the footswitch FS after the foot switch FS has once been turned on, until the N-times bending operation needs. In this case, it is preferable to stop the movement of the lower apron LA in emergency at any position when the foot switch FS is turned on during the N-time bending operation.

Further, in the above embodiment, the lower apron LA is moved up and down relative to the fixed upper apron UA. However, it is of course possible to move the upper apron UA up and down relative to a fixed lower apron LA.

In the press brake PB as shown in FIG. 1(A), when a workpiece is bent into a complicated shape, it is necessary to determining an appropriate workpiece bending sequence so as to eliminate interference of the material with the tool or the machine.

Figure 3A:
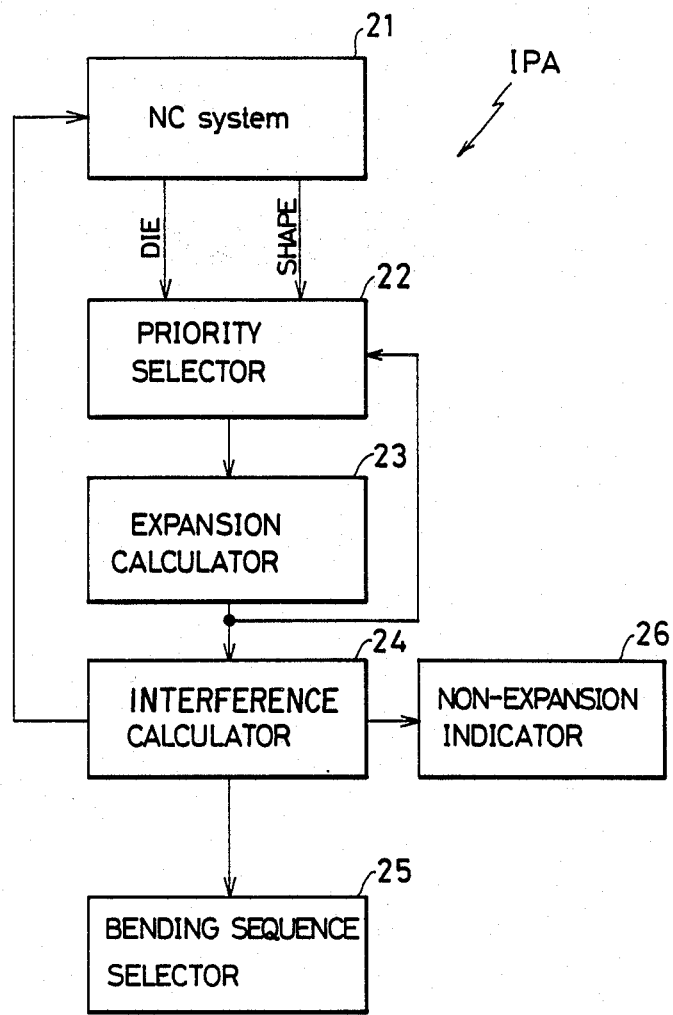
FIG. 3(A) is a block diagram of an interference prevention apparatus incorporated with the press brake.

FIG. 3(A) shows an interference prevention apparatus IPA of the present invention, which comprises an NC system 21, a priority selector 22, an expansion calculator 23, an interfere calculator 24, a bending sequence selector 25, and a non-expansion indicator 26. The priority selector 22 determines the priority of bending sequence on the basis of workpiece final shape data and die information data stored in the NC system. The expansion calculator 23 calculates an expansion shape of the bent workpiece. The interfere calculator 24 determines the presence or absence of interference of the workpiece with the die and the machine both before and after each expansion. When a presence of interference is determined by this calculator 24, the bending priority decision, expansion calculation and interference calculation are repeated. When an absence of interference is not determined even after all the dies have been checked for all the bending points, the non-expansion indicator 26 indicates "unexpandable", that is, "Unbendable". The bending sequence selector 25 selects an expansion sequence in which no interference occurs and determines a bending sequence opposite to the selected sequence (without interference) as a bendable sequence.

Figure 3B:
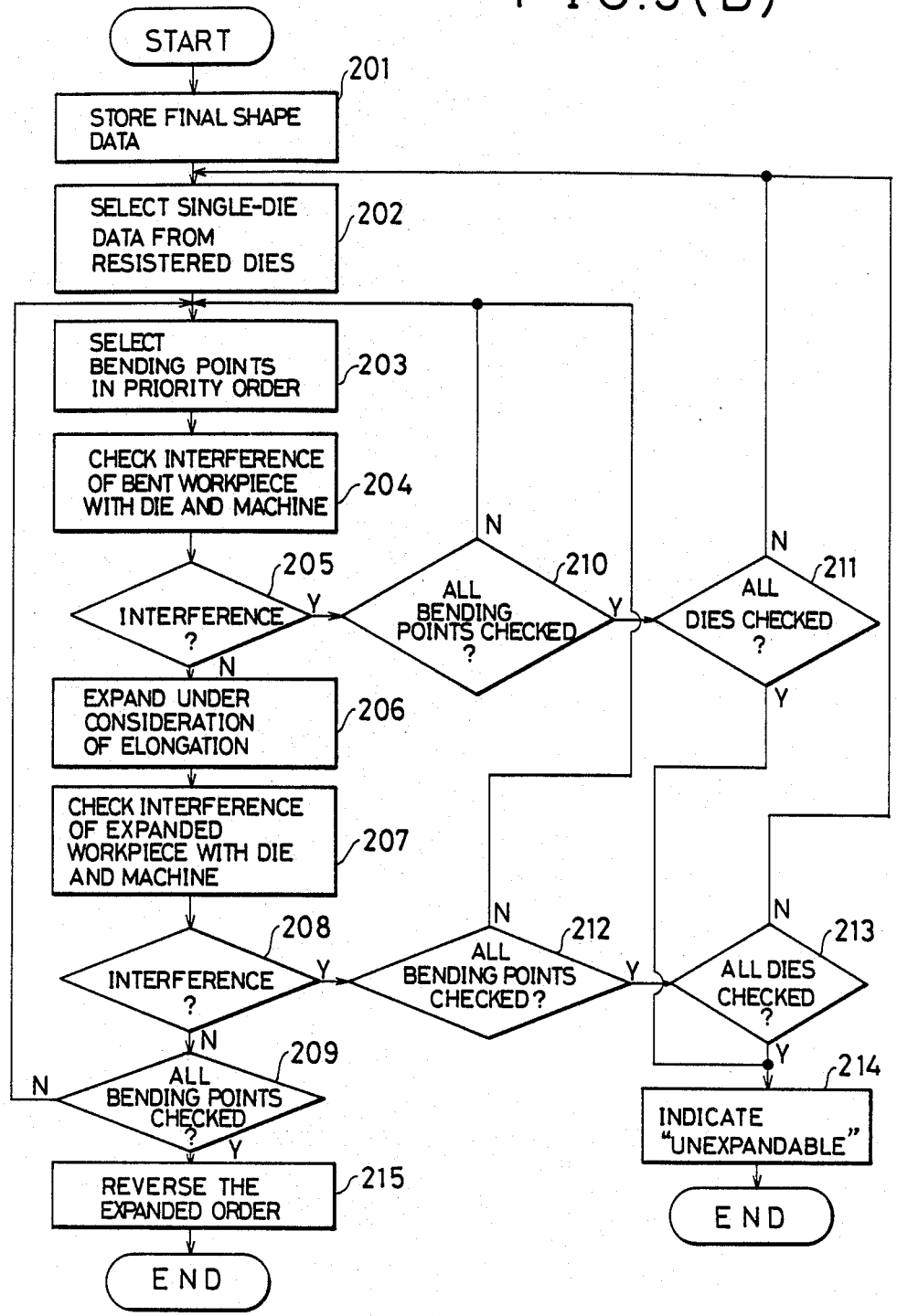
FIG. 3(B) is a flowchart of the operation procedure of the interference prevention apparatus.

FIG. 3(B) shows a flowchart for bending a workpiece W in accordance with a control program implemented by an NC system incorporated in the press brake shown in FIG. 1(A).

In FIG. 3(B), data of a final workpiece shape are stored to the NC system (in step 201). Further, any given die is selected from among various dies registered in the NC system as usable for the machine, and the die data are read (in step 202). In selection of the die information, it is also possible for the operator to select an appropriate die.

The final workpiece shape is expanded at each bending point. The expansion can be started from any given bending point. For instance, the shape is expanded from a bending point located near one end of the workpiece or from that at the middle thereof. However, it is preferable to expand the workpiece shape beginning from a bending point with the highest priority and in the order of the priority. The priority can be decided univocally by the NC system or by the operator (in step 203). The requirements for deciding the priority are: reduction in the number of times of workpiece reversal (the turning around), special shapes as flanges, oblique flange, hem, hat, etc., an important bending point and so on. Further, some information of unexpandable bending points should be taken into account.

Figure 3C:
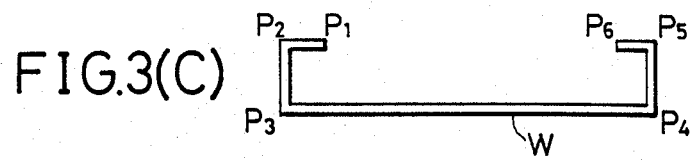
FIG. 3(C) is an illustration showing an example of a workpiece bent into a final shape.
Figures 1, 3D:
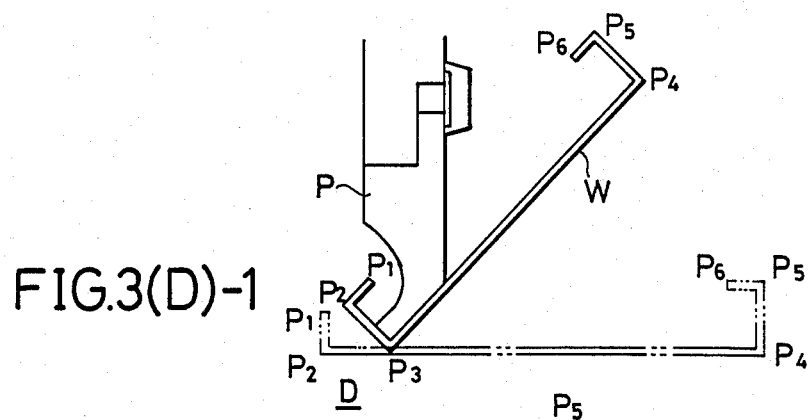
FIG. 3(D)-1, -2, -3 and -4 are illustrations showing an expansion sequence or a bending sequence opposite to the expansion sequence.
Figures 2, 3D:
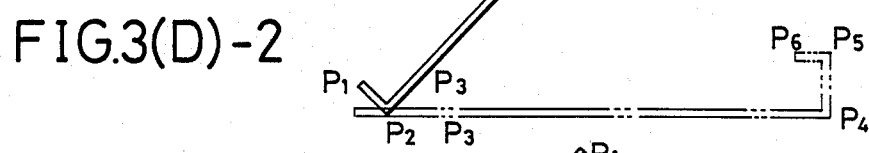

The following steps will be described of an exemplary product having a final shape as shown in FIG. 3(C) by way of example. In expanding the product, it is assumed that the product is first expanded at a bending point $P_3$. In this case, the presence or absence of an interference of the bent workpiece with the punch P and the die D is checked at the bending point $P_3$ as depicted by solid lines in FIG. 3(D)-1 (in step 205). If the absence of an interference is determined (in step 205), the bent workpiece W is then expanded at the bending point P₃, as shown by phantom lines in FIG. 3(D)-1 under consideration of elongation caused by bending (in step 206), and the presence or absence of an interference of the expanded workpiece with the die and the machine is again checked (in step 207). If the absence of an interfere is determined (in step 208), the above procedure (steps 203 to 208) is repeated at all bending points at P₂, P₄ and P₅ as shown in FIG. 3(D)-2 to -4 (in step 209).

In case a presence of interference of the bent workpiece with the die or machine is determined at bending point P₃ (in step 205) before expansion, other interferences at other points are repeatedly checked (in steps 203 to 205), with the interference determined at point P₃ left as it is, until all bending points are checked (in step 210), in order to extract all the bending points at which no interference occurs. Therefore, the bent workpiece is expanded at only the points at which no interference occurs (in steps 206 and after).

In case an interference occurs at some bending points (in step 210), another die is selected (in step 211), returning to the step 202 to repeat the above steps (in steps 202 to 205). If an interference still occurs after all the dies have been selected (in step 211), "Unexpandable" is indicated (in step 214), thus the control flow being completed.

If an interference after expansion at P₃ is determined (in step 208), this point P₃ is determined to be inappropriate, and the presence or absence of interference of the expanded workpiece with the die and the machine at other points is checked in sequence to extract non-interference points in the same way as in step 210 (in step 212). In case, some interference still occurs (in step 212), another dies is selected (in step 213), returning to the step 202 to repeat the procedure, to check interference at each bending point when other dies are used. If an interference still occurs after all the dies have been selected (in step 213), "Unexpandable" is indicated (in step 214), thus the control flow being completed.

In the above step 209, if no interference is determined at the first bending point P₃, the other points P₂, P₄ and P₅ are checked in sequence until the workpiece is expanded into a flat condition. When the workpiece can be expanded into a flat shape without interference, the expansion order is determined to be a bendable order. Therefore, the order opposite to the above determined bendable order is decided as the workpiece bending sequence without interference (in step 215).

As described above, the workpiece is expanded in sequence in the order of priority while checking all possible interferences with the die and the machine, in order to determined an expandable sequence in which no interference will occur. The expansion order is reversed to obtain a bendable sequence.

Figures 3, 3D:
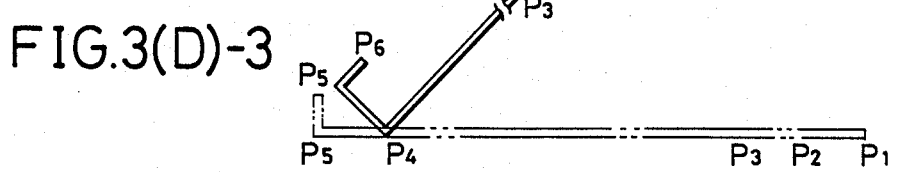
Figures 3, 3D, 4:
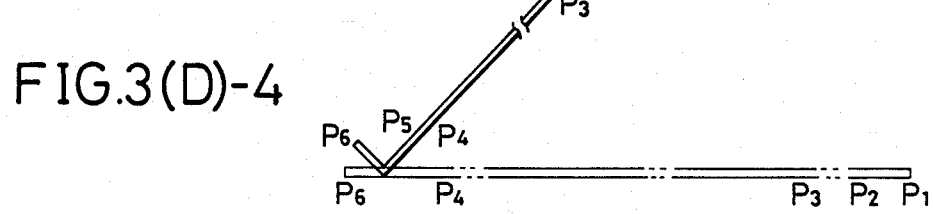

Further, FIG. 3(D)-1 shows a workpiece bent (solid lines) and expanded (phantom lines) at P₃; FIG. 3(D)-2 shows the same workpiece bent (solid lines) and expanded (phantom lines) at P₂; FIG. 3(D)-3 shows the same workpiece turned around and bent (solid lines) and expanded (phantom lines) at P₄; and FIG. 3(D)-4 shows the same workpiece bent (solid lines) and expanded (phantom lines) at P₅.

FIGS. 3(D)-1 to -4 show the case where no interference will occur with the die and the machine before and after expansion in the order of P₃, P₂, P₄ and P₅. Therefore, the bending sequence is determined in the order of P₅, P₄, P₂ and P₃ in the case of this bending product.

When a workpiece is bent between a punch and a die in a press brake, the tool distance should be increased after one bending process has been completed, because the workpiece should be removed from the tool for reversal if necessary. In this case, it is necessary to determine the minimum possible tool distance under consideration of a removal height determined by the shape so far bent and an insertion height determined by the reversed workpiece. This is because if the tool distance is too large, it takes much time to bend the workpiece for the succeeding bending process, thus lowering machine efficiency.

Figure 4A:
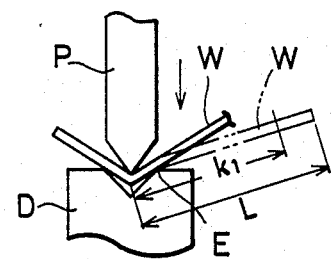
FIG. 4(A) is an illustration for assistance in explaining the so-called second bending.

Further, as shown in FIG. 4(A), when a workpiece W is bent by a punch P and a die D at high speed, if a length L of the workpiece W exceeds a predetermined length $k_1$ under the condition that the workpiece is sandwiched between the two P and D, there exists a problem in that the so-called second bending is effected due to an inertia of the extension portion L of the workpiece W, thus deteriorating the bending accuracy.

Figure 4B:
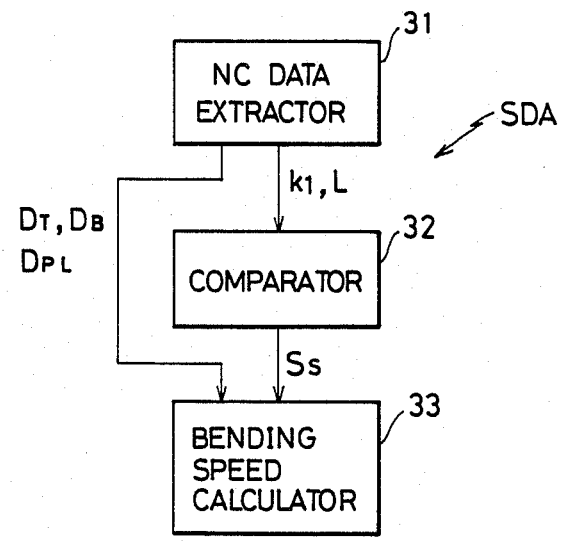
FIG. 4(B) is a block diagram showing a bending speed determining apparatus incorporated with the press brake.
Figure 4C:
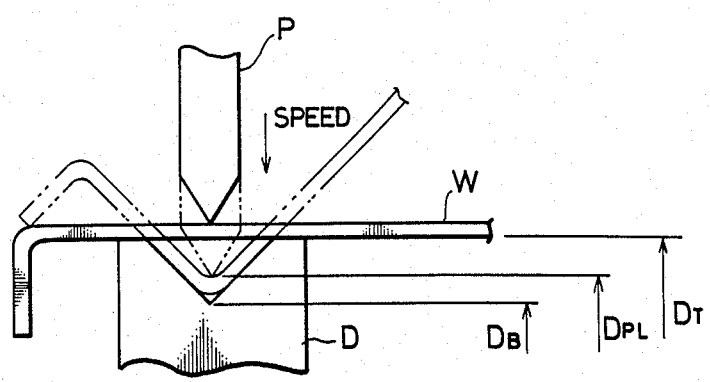
FIG. 4(C) is an illustration for assistance in explaining the die information.

FIG. 4(B) shows a block diagram of a bending speed determining apparatus SDA for preventing the second bending. The apparatus SDA comprises NC data extractor 31, comparator 32 and bending speed calculator 33. The NC data extractor 31 receives necessary data as a workpiece extension length L, an allowable workpiece extension length $k_1$, tool data (as die groove top position $D_T$, die groove bottom position $D_B$, lower limit punch position $D_{PL}$, etc.), as depicted in FIG. 4(C).

The comparator 32 compares the workpiece length L with the allowable length $k_1$ and outputs a speed reduction signal $S_S$ when L is longer than $k_1$. The bending speed calculator 33 calculates a lower bending speed $F_2$ in response to the speed reduction signal $S_S$ by correcting a reference bending speed $F_1$ on the basis of the tool data $D_T$, $D_B$ and $D_{PL}$.

Figure 4D:
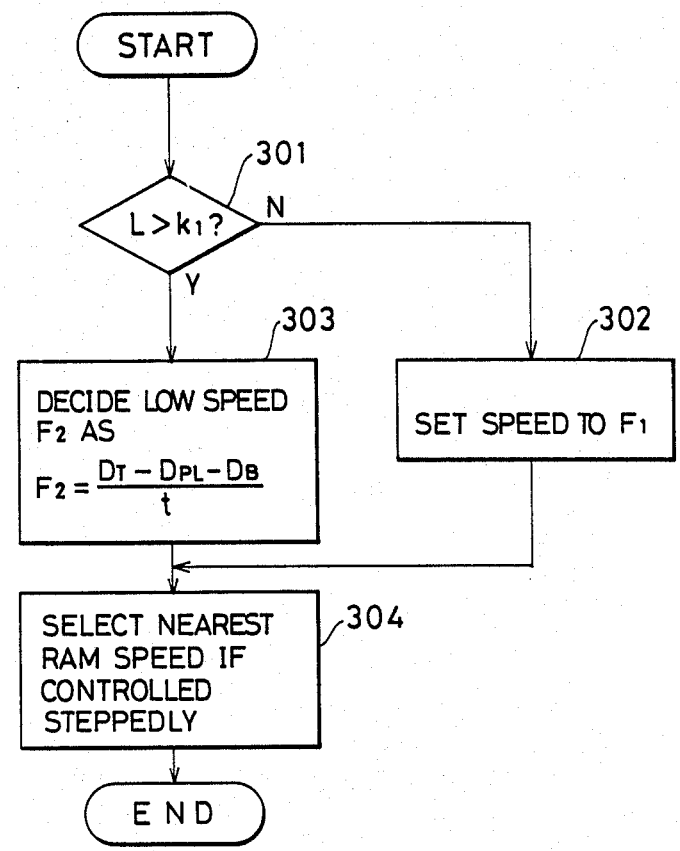
FIG. 4(D) is a flowchart of the operation procedure of the bending speed determining apparatus.

FIG. 4(D) shows the flowchart thereof. The comparator 32 compares L with $k_1$ (in step 301). If L < $k_1$, since the second bending will not occur, the bending speed is determined as a predetermined reference speed $F_1$ (in step 302. However, if L > $k_1$ (in step 301), a low speed $F_2$ is determined by the bending speed calculator 33 on the basis of the following expression:

$$F_2 = (D_T - D_{PL} - P_B)$$

These data are all obtained through the NC data extractor 31.

Further, where the ram speed is adjustable in step fashion, a speed the closest to the calculated speed $F_2$ is selected (in step 304).

In summary, the bending speed is reduced when the workpiece length is too long and therefore the second bending may occur.

Figure 4E:
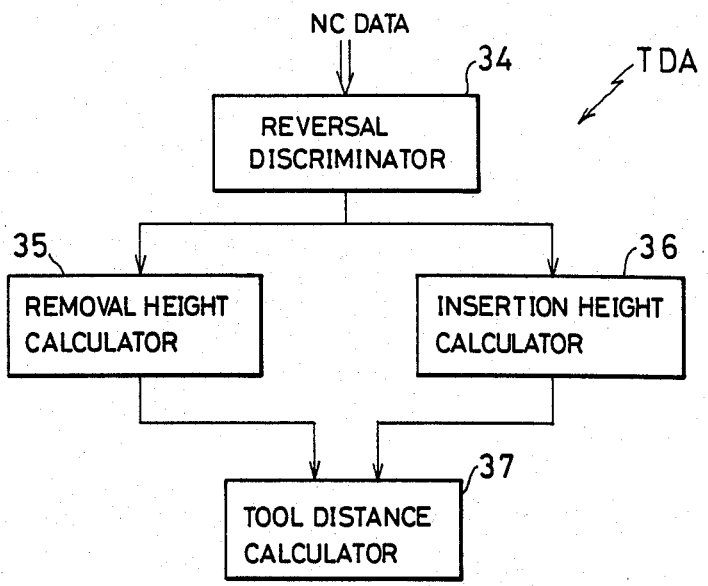
FIG. 4(E) is a block diagram of tool distance determining apparatus incorporated with the press brake.
Figure 4:
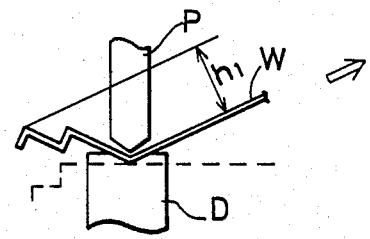

FIG. 4(E) shows a tool distance determining apparatus TDA, which comprises a reversal discriminator 34, a removal height calculator 35, an insertion height calculator 36, and a tool distance calculator 37.

The reversal discriminator 34 discriminates whether the workpiece should be reversed rightside left or vice versa when the bending operation changes from the present process to the succeeding process, on the basis of NC data supplied from the NC system.

Figures 2, 4F:
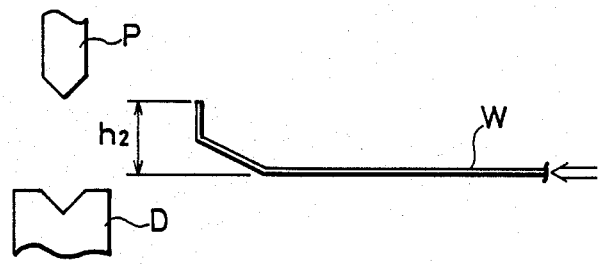

The removal height calculator 35 calculates a removal height $h_1$ required when a workpiece so far bent is removed passing through between the punch P and the die D (tool space), as depicted in FIG. 4(F)-1.

The insertion height calculator 36 calculates an insertion height $h_2$ required when a reversed workpiece is inserted again into the tool space, as depicted in FIG. 4(F)-2.

The tool distance calculator 37 compares the removal height $h_1$ and the insertion height $h_2$, determines a larger height as a necessary height, and adds a surplus thereto.

Figure 4G:
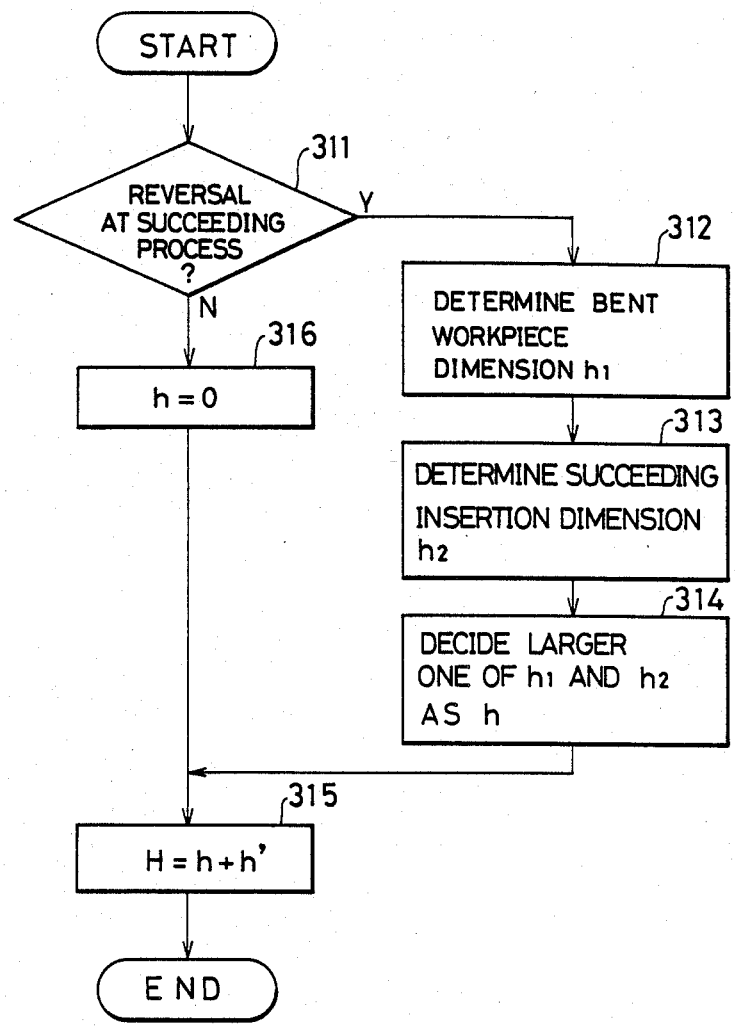
FIG. 4(G) is a flowchart of the operation procedure of the tool distance determining apparatus.

FIG. 4(G) shows a flowchart thereof. Control first determines the necessity of reversal between two bending processes on the basis of the presence or absence of flag supplied from the NC system (in step 311).

If the presence of workpiece reversal is determined, a workpiece removal height $h_1$ required after one bending process has been completed is calculated (in step 312). Further, a workpiece insertion height $h_2$ required when the workpiece is reversed for the succeeding bending process in calculated (in step 313).

These two height $h_1$ and $h_2$ are compared, and either (larger one) of the two is determined as a required tool distance h (in step 314). Further, a surplus h' (e.g. 3 mm) is added to h as a final tool distance H (in step 315).

If no reversal is required for the succeeding process (in step 311), since the workpiece W is not removed, the tool distance is set to h=0 (in step 316), so that the tool distance H is determined as H=h' (in step 315).

The calculated tool distance H is given as the lower limit of the die D to the NC system where the lower apron LA moves toward the upper apron UA. However, the distance H is given as the upper limit of the punch P to the NC system where the upper apron UA moves toward the lower apron LA.

On the basis of the tool distance H, the NC system controls the tool distance between the punch P and the die D whenever the present bending process shifts to the succeeding bending process.

In a bending machine such as a press brake, it is necessary to position a stopper member of the backgage at a predetermined location for the succeeding bending process in order to position a workpiece at a predetermined tool position (the punch and the die).

Figure 5A:
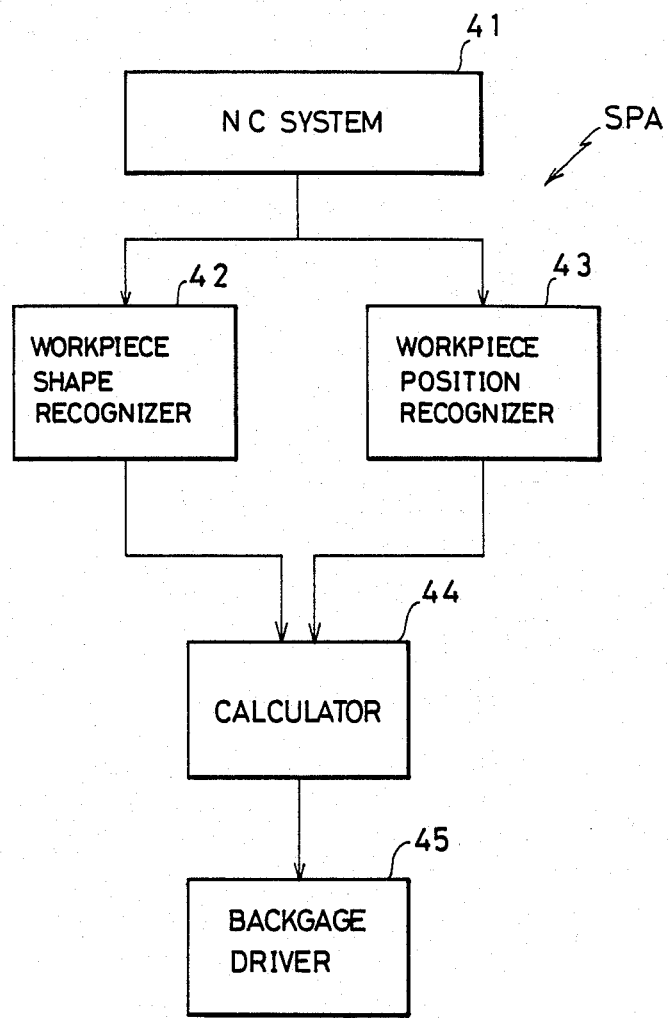
FIG. 5(A) is a block diagram showing a backgage stopper positioning apparatus incorporated in the press brake.
Figure 5B:
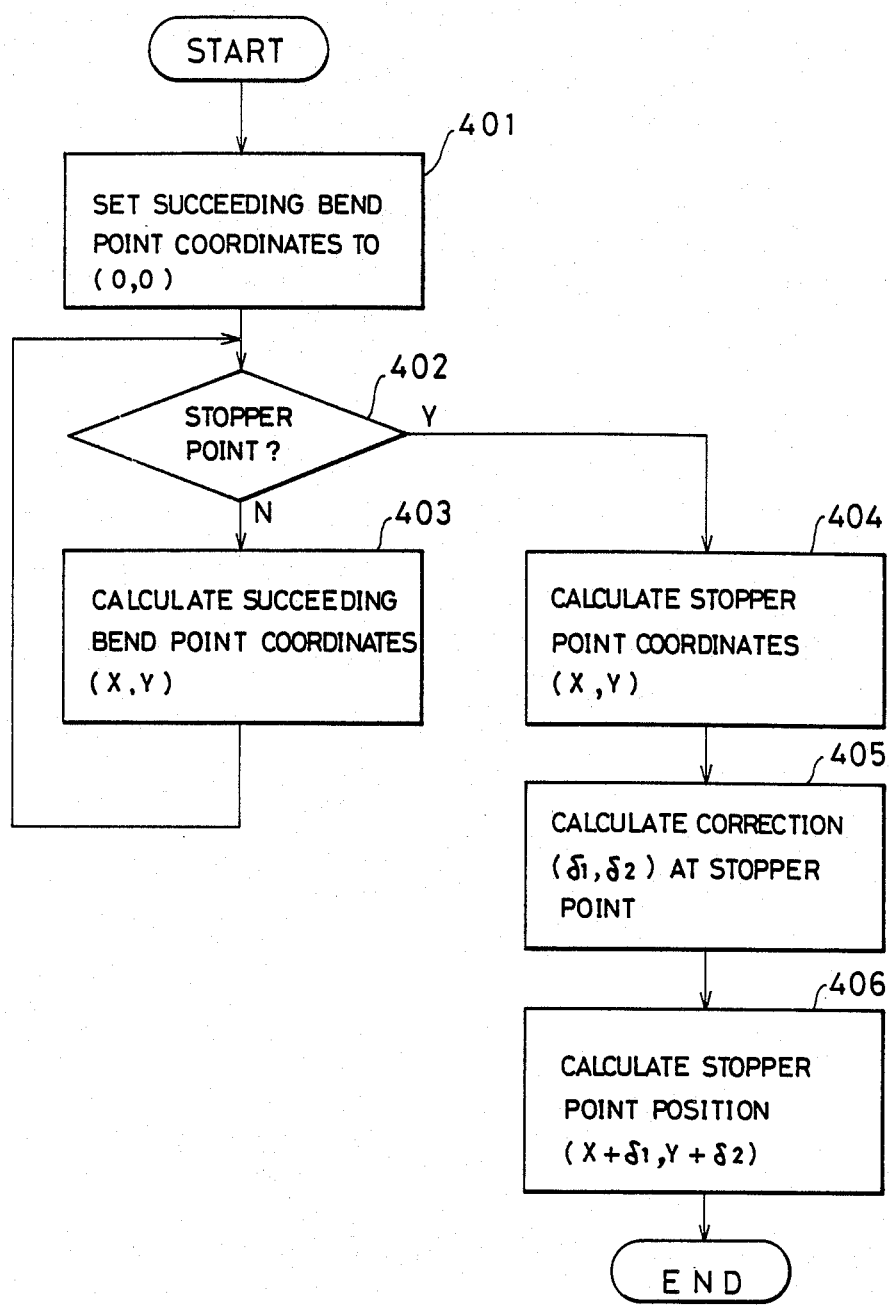
FIG. 5(B) is a flowchart of the operation procedure of the backgage stopper positioning apparatus.

FIG. 5(A) shows an automatic backgage stopper positioning apparatus SPA of the present invention. The apparatus SPA comprises an NC system 41, a workpiece shape recognizer 42, a workpiece position recognizer 43, a calculator 44, and a backgage driver 45. The NC system 41 stores various information such as workpiece shape workpiece thickness, bending process information, bending sequence, die, etc. The workpiece shape recognizer 42 recognizes a current workpiece shape so far bent in the past bending operations on the basis of the information from the NC system. The workpiece position recognizer 43 recognizes the succeeding bending position on the basis of the bending sequence information from the NC system 41. The calculator 44 calculates the succeeding stopper position on the basis of recognition signals from the workpiece shape recognizer 42 and the workpiece position recognizer 43 in accordance with the following procedure as shown in FIG. 5(B).

Figure 5C:
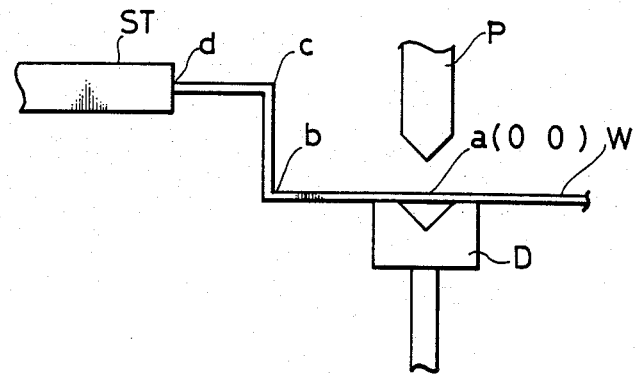
FIG. 5(C) is an illustration for assistance in explaining the interference of a workpiece with a stopper member.

That is, on the basis of the information from the workpiece position recognizer 43, the calculator 44 sets the tool position a as coordinate values (0, 0) (in step 401). Then, the calculator 44 searches all the already bent positions including an end b, c, and d located between the stopper member ST and the succeeding tool position a, as shown in FIG. 5(C), in sequence. When the succeeding bending point b on the stopper member side is determined on the basis of the information from the workpiece shape recognizer 42, it is discriminated whether the succeeding bending point b is a stopper position (in step 402). If not a stopper position, the coordinates (X, Y) of the succeeding bending point b are calculated (in step 403). The above calculation is repeated to obtain all the coordinates (X, Y) of all bending points located on the stopper member side (in steps 402 and 403). These coordinates at bending points b and c are determined on the basis of information such as bending angles and signs, workpiece thickness, elongations, flange heights, etc. supplied from a workpiece shape recognizer 42.

By obtaining all the bending point coordinates on the stopper member side, a stopper point d is finally determined as a stopper position and the stopper point coordinate (X, Y) is calculated (in step 404). The obtained stopper point d is corrected according to the workpiece shape (in step 405).

Figures 1, 5D:
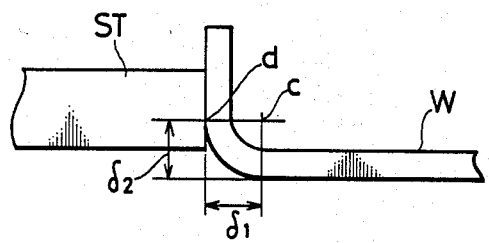
Figures 2, 5D:
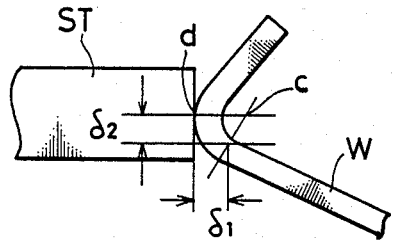
Figures 3, 5D:
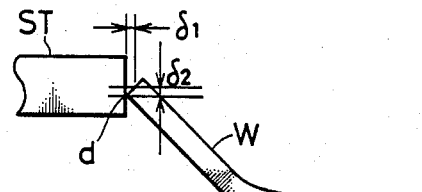

For instance, where the workpiece W is bent at a right angle along a circular arc as shown in FIG. 5(D)-1, coordinates ($\delta_1$, $\delta_2$) from a bending center C are calculated. Further, as shown in FIG. 5(D)-2, where the workpiece W is bent at an acute angle, coordinates ($\delta_1$, $\delta_2$) from the bending center C are calculated as correction values. Furthermore, as shown in FIG. 5(D)-3, where the oblique workpiece end is brought into contact with the stopper member ST, coordinates ($\delta_1$, $\delta_2$) from the thickness center at the end are calculated as the correction values. These correction values are added to the stopper point coordinate (X, Y) at stopper point d as the final coordinates (in step 406).

In the above embodiment, although the final stopper position is calculated on the basis of the coordinates, it is also possible to calculate the position on the basis of some calculation equations.

Or else, it is also possible to adopt a look-up table method. In this case, the table lists the previously calculated relationship between calculated bending position and stopper position at each bending operation, and the table is stored in the NC system. The listed stopper position is read therefrom prior to each bending operation, and processed in accordance with the above procedure.

Once the stopper position for the succeeding bending operation is determined, this value is supplied from the calculator 44 to the backgage driver 45 to adjustably position the backgage along the back-and-forth direction (X) and the vertical direction (Y). As already explained with reference to FIG. 1(B), the X-direction of the backgage BG can be adjusted by the motors M, the lead screws 2 and the linear guides 3, while the Y-direction thereof can be adjusted by the lifting devices 6.

During the multistep bending process, since a workpiece is bent and deformed, the end thereof is inevitably moves. Therefore, if the backgage stopper member is kept at a constant position, the bent workpiece may interfere with the stopper member. To prevent this interference, it is necessary to move the stopper member away from the workpiece.

Figure 6A:
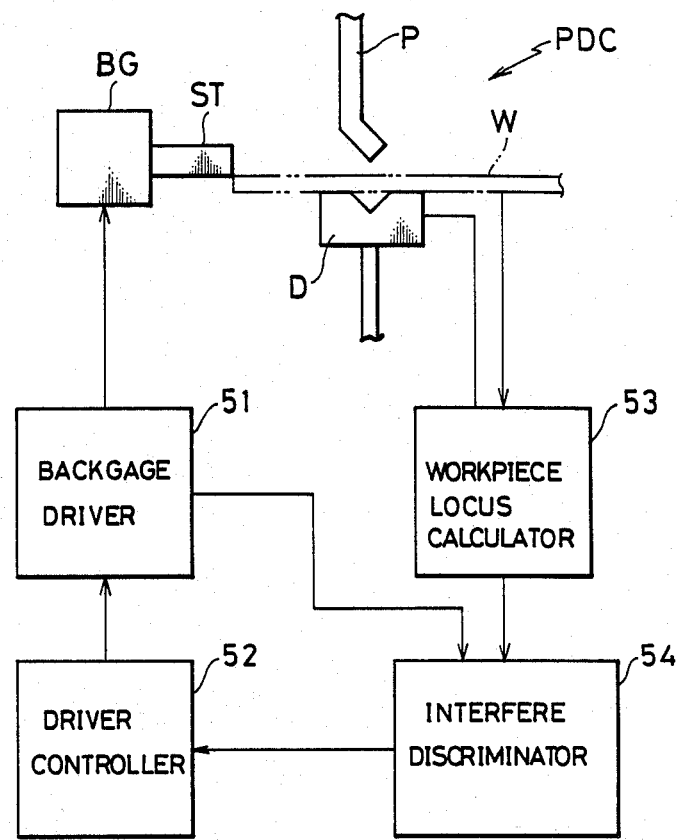
FIG. 6(A) is a block diagram showing a backgage stopper pull-back distance controlling apparatus incorporated in the press brake.

FIG. 6(A) shows a backgage pull-back distance controller PDC of the present invention. The controller PDC comprises a backgage driver 51, a drive controller 52, a workpiece locus calculator 53, and a interfere discriminator 54. The backgage driver 51 drives the stopper member 7 of the backgage BG. This driver 51 is made up of the motors M, the lead screws 3, and the linear motion guides 3 as shown in FIG. 1(B). The driver controller 52 controls the backgage driver 51 so that no interference will occur.

The workpiece locus calculator 53 calculates the movement locus of the workpiece end on the basis of various bending information of the punch P, the die D and the workpiece shape all stored in the NC system. The interfere discriminator 54 discriminates whether an interference occurs between the workpiece W and the stopper member ST in the succeeding bending process on the basis of a workpiece movement locus calculation signal from the locus calculator 53 and a position signal from the backgage driver 51.

Figure 6B:
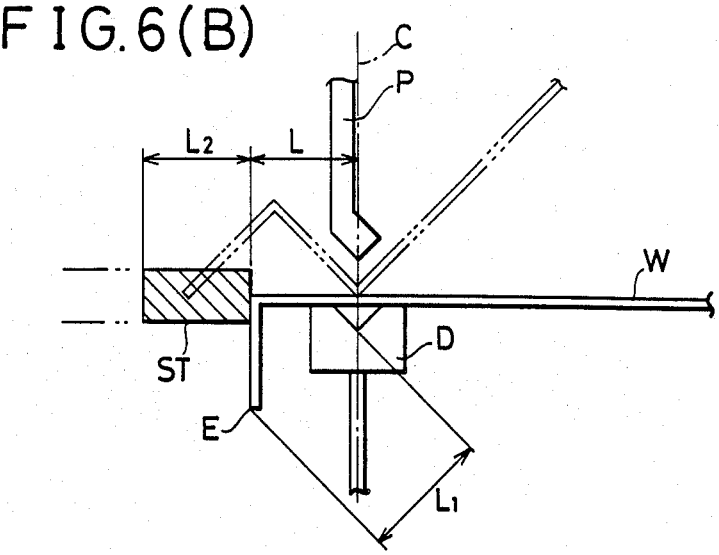
FIG. 6(B) is an illustration for assistance in explaining a pull-back distance.
Figure 6C:
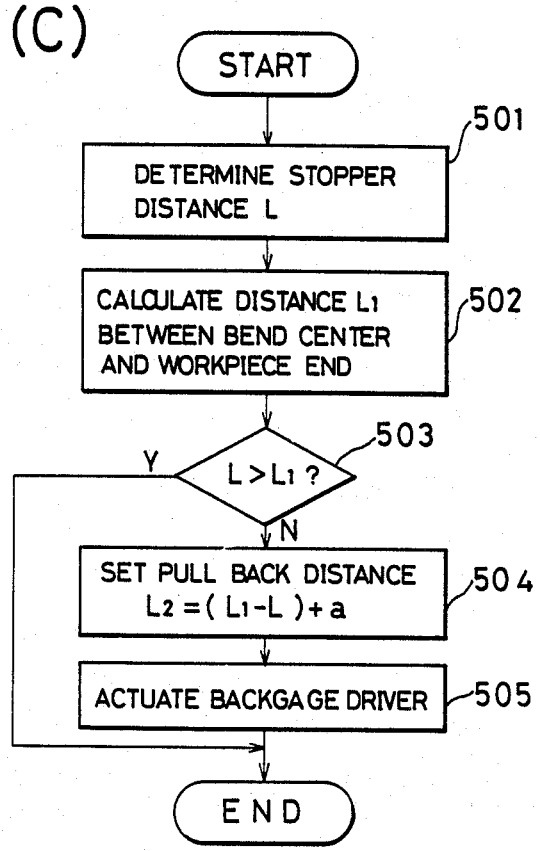
FIG. 6(C) is a flowchart of the operation procedure of the backgage stopper pull-back distance controlling apparatus.

With reference to FIG. 6(B) and (C), the operation of the pull-back distance controller PDC will be described. The NC system of the press brake PB outputs various data such as a workpiece shape, bending distance L, etc. for each bending process. On the basis of the data, the backgage driver 51 moves the backgage stopper ST to a position a distance L away from the tool position C (in step 501). The workpiece locus calculator 53 extracts an end point E of the workpiece W located below the stopper member ST and calculates a workpiece end distance $L_1$ between the end point E and the bending center C (in step 502). The interfere discriminator 54 compares the stopper distance L with the longest workpiece end distance $L_1$ to determine the presence or absence of an interference between the stopper member ST and the workpiece W (in step 503). If a presence of interference is determined ($L < L_1$) in step 503, a pull-back distance $L_2$ is calculated as follows (in step 504).

$$L_2 = (L_1 - L) + a$$

where a denotes a surplus.

Once a pull-back distance $L_2$ is determined, the driver controller 52 actuates the backgage driver 51 to pull back the stopper member ST by a distance $L_2$ to prevent the interference. Further, if an absence of interference is determined ($L > L_1$) in step 503, the bending will be made without pull-back operation.

In the above embodiment, the distance, $L_1$ between the workpiece end E and the tool center C is directly calculated and compared with the stopper distance L. However, without being limited this calculation, it is also possible to determine a presence or absence of an interference between the two on the basis of coordinate calculation. In this case, the stopper end and the workpiece end (before bending) are both defined as coordinate values.

What is claimed is:

1. A multistep bending machine having a pair of fixed and movable aprons (UA, LA) with a pair of bending tools (P, D), respectively; a backgage (BK) provided with a stopper member (ST) for positioning an end of a workpiece W; and an NC system operated by a switch (FS), which comprises:
    (a) means (M, P, M-SOL) for moving the movable apron (LA) toward the fixed apron (UA) for bending operation, including:
        (1) a hydraulic motor (M);
        (2) a hydraulic pump (P) driven by said hydraulic motor (M): and
        (3) a main cylinder (M-CY) for hydraulically moving the movable apron toward the fixed apron;
    (b) means (ULV) for determining a limit position of the movable apron (LA) relative to the fixed apron (US), including a limit valve (ULV) for releasing hydraulic pressure supplied from said hydraulic pump to said main cylinder;
    (c) means (DDM) for moving the movable apron in multistep manner between two limit positions at predetermined time intervals when said movable apron moving means are being actuated, including:
        (1) a tool-axis motor (MD);
        (2) a feed screw (10) rotated by said tool-axis motor;
        (3) a movable element (12) moved back and forth by said feed screw;
        (4) a link (13) pivoted by said movable element,
        (5) a lever (14) pivotally supported by said link, a first free end (14A) thereof being contactable with the movable apron (LA) and a second free end (14B) thereof being contactable with said limit valve (ULV); and
        (6) when said movable element (12) is driven in a first direction (+) by said tool-axis motor via said freed screw, the second end (14B) of said lever actuating said limit valve opens to move the movable apron away from the fixed apron; when said movable element is driven in a second direction (−), the second end (14B) of said lever deactuating said limit valve closes to move the movable apron toward the fixed apron; when the movable apron is moved close to the fixed apron for bending, the first end (14A) of said lever is brought into contact with the movable apron so that the second end (14B) of said lever actuating again said limit valve opens to move the movable apron away from the fixed apron, for achieving multistep bending operation; and
    (d) interference prevention means (IPA) including:
        (1) a priority selector (22) operationally connected to said NC system for determining priority of bending sequence on the basis of workpiece final shape data and die information data stored in said NC system;
        (2) an expansion calculator (23) operationally connected to said priority selector (22) for calculating an expansion shape of a bent workpiece at a bending point in the order of the determined bending priority selected by the priority selector;
        (3) an interference calculator (24) operationally connected to the expansion calculator, priority selector, and NC system for determining presence or absence of interference of the workpiece with the machine both before and after expansion at a bending point, when a presence of interference is determined, said priority selector, said expansion calculator and said interference calculator repeating the above same operation for all bending points and all dies in sequence;
        (4) a bending sequence selector (25) operationally connected to the interference calculator for selecting an expansion sequence in which no interference occurs and determining a bending sequence opposite to the selected expansion sequence as a bendable sequence; and
        (5) a non-expandable indicator (26) operationally connected to the interference calculator which indicates "Unexpandable" when an absence of interference is not determined even after all the dies have been checked at all the bending points.

2. The multistep bending machine as set forth in claim 1, which further comprises bending speed determining means (SDA) including:

(a) a comparator (32) for comparing a workpiece length L extending from the die with an allowable length $k_1$ and generating a speed reduction signal $S_S$ when L exceeds $k_1$; and (b) a bending speed calculator (33) for calculating a lower bending speed $F_2$ in response to the speed reduction signal $S_S$ by correcting a reference bending speed $F_1$ on the basis of tool information data.

3. The multistep bending machine as set forth in claim 1, which further comprises tool distance determining means (TDA) including:

(a) a reversal discriminator (34) for discriminating whether a workpiece is reversed rightside left or vice versa when the present bending process shifts to the succeeding bending process on the basis of NC data;

(b) a removal height calculator (35) for calculating a removal height $h_1$ necessary when a workpiece so far bent is removed from a tool space;

(c) an insertion height calculator (36) for calculating an insertion height $h_2$ required when a reversed workpiece is inserted again into the tool space; and (d) a tool distance calculator (37) for comparing the removal height $h_1$ and the insertion height $h_2$, determining a higher height as a necessary height and adding a surplus value to the determined height.

4. The multistep bending machine as set forth in claim 1, which further comprises backgage stopper positioning means (SPA) including:

(a) a workpiece shape recognizer (42) for recognizing a current workpiece shape so far bent on the basis of information supplied from the NC system;

(b) a workpiece position recognizer (43) for recognizing a succeeding bending position on the basis of the bending information supplied from the NC system; and (c) a calculator (44) for calculating a succeeding stopper position on the basis of the current workpiece shape and the succeeding bending position.

5. The multistep bending machine as set forth in claim 4, which further comprises backgage stopper pull-back distance controlling means (PDC) including:

(a) a backgage driver (51) for moving the backgage and outputting a backgage position signal;

(b) a workpiece locus calculator (53) for calculating a movement locus of a workpiece end on the basis of bending information data stored in the NC system;

(c) an interfere discriminator (54) for discriminating whether an interference occurs between the workpiece and the stopper member in the succeeding bending process on the basis of the calculated movement locus and the detected backgage position signal, to pull-back the backgage before the succeeding bending operation.

6. A method of multistep bending a workpiece by a bending machine having a pair of fixed and movable aprons (UA, LA) with a pair of bending tools (P, D), respectively; a backgage (BG) provided with a stopper member (ST) for positioning an end of a workpiece W; and an NC system operated by a switch (FS), which comprises the following steps of:

(a) positioning a workpiece in both horizontal and vertical direction by the backgage;

(b) turning a tool switch (FS) on;

(c) moving the movable apron toward the fixed apron by actuating a hydraulic cylinder (M-CYL) and stopping the movable apron at a limit position by a limit valve (ULV) for a first bending operation;

(d) after a predetermined time ($t_1$) has elapsed, driving a motor (MD) to move the movable apron away from the fixed apron;

(e) positioning the workpiece in the horizontal direction again;

(f) after a predetermined time ($t_2$) has elapsed, driving the motor (MD) in the reverse direction to move the movable apron toward the fixed apron for a second bending operation;

(g) repeating the above operation N times;

(h) obtaining a final workpiece data from the NC system;

(i) selecting information data of a die from among registered dies from the NC system;

(j) selecting bending points in priority order;

(k) checking presence or absence of interference of the bent workpiece with the machine at a bending point;

(l) if an interference occurs, presence or absence of interference is checked for all bending points and all dies;

(m) if no interference occurs, expanding the bent workpiece at the bending point;

(n) checking presence or absence of interference of the expanded workpiece with the machine;

(o) if an interference occurs, presence or absence of interference is checked for all bending points and all dies;

(p) if no interference occurs, reversing a determined expanded sequence involving no interference to obtain an expandable bending sequence;

(q) if it is impossible to determine an expansion sequence involving no interference after all bending points and all dies have been checked, indicating "Unexpandable";

(r) moving the movable apron away from the fixed apron; and (s) turning off the foot switch.

7. The method as set forth in claim 6, which further comprises a method of determining a bending speed having the following steps of:

(a) comparing a workpiece length (L) extending from a tool center with an allowable length $k_1$;

(b) generating a speed reduction signal when the workpiece length (L) exceeds the allowable length ($k_1$) and (c) calculating a lower bending speed ($F_2$) in response to the speed reduction signal by correcting a reference bending speed ($F_1$) on the basis of tool information data.

8. The method as set forth in claim 6, which further comprises a method of determining tool distance including the following steps of:

(a) discriminating whether a workpiece is reversed rightside left or vice versa when the present bending process changes to the succeeding bending process on the basis of NC data;

(b) calculating a removal height ($h_1$) necessary when a workpiece so far bent is removed from a tool space;

(c) calculating an insertion height ($h_2$) required when a reversed workpiece is inserted again into the tool space; and (d) comparing the removal height ($h_1$) and the insertion height ($h_2$) and determining a higher height as a necessary height; and (e) adding a surplus value (a) to the determined height.

9. The method as set forth in claim 6, which further comprises a method of positioning backgage stopper having the following steps of:
- (a) recognizing a current workpiece shape so far bent on the basis of information supplied from the NC system;
- (b) recognizing a succeeding bending position on the basis of information supplied from the NC system;
- (c) setting the succeeding bending point (a) to coordinates (0, 0);
- (d) checking whether the bending point (a) is a stopper position;
- (e) if not the stopper position, repeating the step (d) above;
- (f) if the stopper position, obtaining stopper position coordinates as (X, Y);
- (g) calculating correction coordinates ($\delta_1$, $\delta_2$) at the stopper position; and
- (h) calculating the stopper position as (X+$\delta_1$, X+$\delta_2$).

10. The method as set forth in claim 9, which further comprises a method of controlling a backgage stopper pull-back distance including the following steps of:
- (a) setting a backgage stopper (ST) to a position a distance L away from a tool position;
- (b) calculating a distance $L_1$ between a tool center and a workpiece end;
- (c) comparing the two distance L and $L_1$;
- (d) if $L_1$ is longer than L, setting a pull-back distance $L_2$ as ($L_1 - L$)+a, where a denotes a surplus; and
- (e) setting a backgage driver to a position a distance $L_2$ further away from the tool center.

* * * * *